(12) United States Patent
Maeda

(10) Patent No.: US 7,176,166 B2
(45) Date of Patent: Feb. 13, 2007

(54) SLIDE MEMBER

(75) Inventor: Kurodo Maeda, Aichi-ken (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 460 days.

(21) Appl. No.: 10/685,512

(22) Filed: Oct. 16, 2003

(65) Prior Publication Data

US 2007/0004598 A1    Jan. 4, 2007

(30) Foreign Application Priority Data

Oct. 29, 2002  (JP) ............................. 2002-314610

(51) Int. Cl.
  *C04B 35/52* (2006.01)
  *F16C 33/04* (2006.01)
  *F16C 33/20* (2006.01)
  *F01B 31/10* (2006.01)
  *F16J 1/04* (2006.01)

(52) U.S. Cl. .................. 508/106; 92/158; 92/223; 123/193.4; 508/100; 508/107; 508/108; 508/109

(58) Field of Classification Search .............. 508/100, 508/106, 107, 108, 109; 92/158, 223; 123/193.4
  See application file for complete search history.

(56) References Cited

U.S. PATENT DOCUMENTS

| 5,525,246 A | 6/1996 | Kamiya et al. |
| 6,155,721 A | 12/2000 | Kurosawa et al. |
| 2003/0089223 A1* | 5/2003 | Sugioka et al. ................. 92/70 |

FOREIGN PATENT DOCUMENTS

| JP | 01-193068 | 8/1989 |
| JP | 01-261514 | 10/1989 |
| JP | 02-178395 | 7/1990 |
| JP | 04-088209 | 3/1992 |
| JP | 06-279708 | 10/1994 |
| JP | 07-097517 | 4/1995 |
| JP | 7-189804 | * 7/1995 |
| JP | 07-247493 | 9/1995 |
| JP | 09/302226 | 11/1997 |
| JP | 10-37962 | 2/1998 |
| JP | 10-244628 | 9/1998 |
| JP | 11-106775 | 4/1999 |
| JP | 2000-074136 | 3/2000 |
| JP | 2000-88101 | * 3/2000 |
| JP | 2000-230185 | 8/2000 |
| WO | WO 92/01872 | 2/1992 |
| WO | WO 02/099019 | 12/2002 |

* cited by examiner

*Primary Examiner*—Patrick D. Niland
(74) *Attorney, Agent, or Firm*—Finnegan, Henderson, Farabow, Garrett & Dunner, LLP

(57) ABSTRACT

The present invention intends to provide a slide member with increasing an abrasion resistance and an adherence, a friction coefficient is further decreased.

A part of the base member surface of the slide member is provided with a streak so that a surface roughness thereof by a ten-point height of roughness profile is 8 to 18 μmRz. A dry coat lubricant has polyamideimide resin, at least one kind of a layer improve agent selected from epoxysilane and epoxy resin, and at least one kind of hard particles selected from a silicon nitride and an alumina. Such construction can not only increase the abrasion resistance and the adherence of the slide member, but can decrease friction coefficient of the slide member.

6 Claims, 7 Drawing Sheets

SLIDE MEMBER

BACKGROUND OF THE INVENTION

1. Field of the Invention

The present invention relates to a slide member formed thereon a coat layer made of a dry coat lubricant to increase abrasion resistance and to decrease frictional coefficient.

2. Description of the Related Art

Various slide members sliding relative to a mate member with contacted therewith have been known. In such slide members, a coat layer (film) made of resin binder, hard particles and a solid lubricant etc. is formed on surface of a base (mother) member. The coat layer increases the abrasion resistance and decreases the friction coefficient of the slide member (refer to Patent documents 1 to 3 listed below).

When these coat layers described in the patent documents 1 to 3 are formed by one coat, there may be cases adherence of the coat layer to the base member is not sufficient. If the adherence is insufficient, the coat layer may be peeled off from the base member surface in relatively short time period, depending on using condition of the slide member. Thus, duration of increased abrasion resistance and decreaced friction coefficient resulted from the coat layer is hindered. In view of this, a primer for securing the adherence is coated on the base member in advance, as occasion demands. Then, the coat layer is coated the primer on an upper layer thereof. As a result, man-hour and cost for the coating increases.

When an aluminum alloy and a magnesium alloy poor in slide property are used for the base member, burn-in (seizing) or galling may occur if using condition is strict. Due to large friction coefficient of the aluminum alloy and magnesium alloy, following two manners have been adopted when these materials are used for the base member. The first manner is to plate nickel, tin or denature cover film treatment on the base member surface. The second manner is to cover or coat the base member surface by the dry coat layer (film) made by mixing some kinds of solid lubricants with the thermosetting resin. In any manners, treating cost increases.

Complex plating in which the solid lubricant is dispersed, is effective to prevent occurrence of seizing. However, the plated layer made of the complex plate has large friction coefficient and is expensive. In addition, making the plated layer thicker needs additional finishing process, which hinders adaptation of the plated layer to the aluminum alloy.

A composition in which some kinds of solid lubricants are mixed with the conventional thermosetting resin is used as the coat layer. However, due to low adherence, the coat layer is apt to be peeled off from the base member, resulting in earlier abrasion of the slide member.

For overcoming disadvantage of the above slide members, Applicant of this application has developed the dry coat lubricant (refer to Patent document 4 below) which has the low friction coefficient and high abrasion resistance. This dry coat lubricant increases adherence to the base member, in addition to the above mentioned advantage, and can make the coat layer thicker by one coating, regardless of kind of the base member. However, for further increasing the slide property, the slide member in which the friction quality such as the friction coefficient, abrasion resistance, and seizing preventing property to the base member are further improved, has been required.

[Patent document 1] Japanese Patent Laid-open No. 10-37962

[Patent document 2] Japanese Patent Laid-open No. 7-97517

[Patent document 3] Japanese Patent Laid-open No. 6-279708

[Patent document 4] Japanese Patent Application No. 2002-16023

SUMMARY OF THE INVENTION

The present invention has been made in view of the above mentioned circumstances, and has an object to provide the slide member which can further reduce the friction coefficient, with increased the abrasion resistance and adherence.

The slide member of the present invention is comprised of a base member, and a coat layer made of dry coat lubricant formed at least a part of a surface of the base member to be formed into a slide surface. The part of the base member surface is provided with streak so that a surface roughness in ten-point height of roughness profile (JIS B0601 (2001)) is 8 to 18 μmRz. The dry coat lubricant has polyamideimide resin at least one kind of layer improve agent selected from, epoxysilane and epoxy resin, and at least one kind of hard particles selected from silicon nitride and alumina.

Conventionally, streak is formed on a surface of the base member of the slide member, to prevent occurrence of seizing. With the streak formed on the base member surface, even when the base member directly contact with (abuts to) the mate member at the exposed surface thereof due to wear of the cover layer, seizing of the slide member to the mate member can be securely reduced.

It is assumed as the surface roughness of the coat layer becomes smaller, the friction coefficient decreases. Making the surface roughness of the base member small is effective to make the surface roughness of the cover layer. To the contrary, forming streak on the base member surface for prevention of the seizing makes the surface roughness of the base member large, which results in larger surface roughness of the cover layer. This is antimony to the above requirement.

Inventors of this application, as result of hard and careful study, found out preferable surface roughness of the slide surface provided with the streak and preferable composition of the cover layer, for reducing the friction coefficient of the slide member. The surface roughness defined by the streak is preferably 8 to 18 μmRz in ten-point height of roughness profile. The coat layer is preferably made of dry coat lubricant of particular composition.

According to the above slide member, various advantages such as reduction of the friction coefficient, increase of the abrade resisting property, and increase of the adherence all of which are resulted from the coat layer made of dry coat lubricant can be rendered. In addition, the seizing prevention resulted from formation of the streak is rendered. Further, friction reduction of the slide member becomes prominent, compared with the slide member not provided with streak and the ten-point average surface roughness of the surface provided with the streak is smaller than or larger than 8 to 18 μmRz.

The epoxysilane is preferable as a layer improve agent. The dry coat lubricant preferably includes at least one kind of the solid lubricant selected from polytetrafluoroethylene, molybdenum disulfide and graphite.

As the surface roughness of the cover layer, 0.5 to 7 μmRz by the ten-point height of roughness profile is preferable. Preferable film thickness of the coat layer is 8 to 20 ∥m. Typical slide member is a piston, and the streak and coat layer are formed on a skirt portion thereof.

According to the slide member of the present invention, the decrease effect of the friction coefficient, increase effect of the adherence, increase effect of the abrasion resistance all of which resulted from the dry coat lubricant, can be rendered. In addition, the bake preventing effect resulted from formation of the streak can be exhibited.

Further, the friction coefficient can be further decreased and the abrasion resistance is further increased by peculiar combination of the dry coat lubricant and peculiar surface roughness by formation of the streak. This advantages are brought by the peculiar construction that, the part of the base member surface is provided with streak so that a surface roughness in ten-point height of roughness profile is 8 to 18 μmRz; and the dry coat lubricant has polyamideimide resin, at least one kind of layer improve agent selected from epoxysilane and epoxy resin, and at least one kind of hard particles selected from silicon nitride and alumina.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Figure 1:
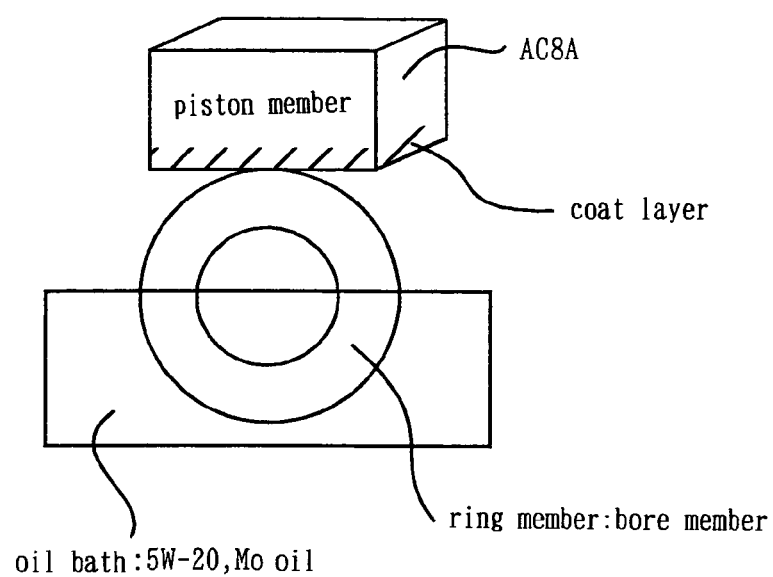
FIG. 1 is a schematic view showing the abrade test method.

Having generally described the present invention, a further understanding can be obtained by reference to the specific preferred embodiments which are provided herein for the purpose of illustration only and not intended to limit the scope of the appended claims.

The dry coat lubricant includes polyamideimide resin which is thermally stable as the resin binder and having the high abrasion resistance and the larger adherence, the hard particles and spray film (coat) improve agent. To the dry coat lubricant, the solid lubricant and polyester-denatured-silicon resin can be put together, as occasion demands. Further, a pigment can be added as occasion demands. The dry coat lubricant having such composition can render the slide member the high abrasion resistance, low friction coefficient and the high adherence.

The dry coat lubricant of the present invention includes polyamideimide resin as a main component, and further includes the layer improve agent for the polyamideimide resin, and the hard particles.

As the forming resin which becomes the main member of the dry layer, well-known polyamideimide resin excellent in the heat resistance and the adherence can be used. Available polyamideimide resin is used for coating the base member.

The layer improve agent is added matters for increasing property of the resin binder comprised of the hard particles, solid lubricant and the resin binder. It especially increases property of polyamideimide of the resin binder, whereby substance nature of the dry coat lubricant is improved.

As the layer improve agent, the epoxy resin or epoxysilane is used alone, or both of them are put together. The epoxysilane is preferably used alone. The polyether-denatured-silicon resin can be used together with the epoxysilane.

For increase of the abrasion resistance and the adherence of the dry coat lubricant, the adding amount of the epoxy resin is preferably 0.5 to 10 volume part, relative to 100 volume part of polyamideimide. Adding amount of the epoxy resin less than 0.5 volume part, rendering no effect, is not preferable. Adding amount of epoxy resin more than 10 volume part, decreasing abrasion resistance and adherence, is not preferable.

The epoxy resin has good compatibility with the liquid polyamideimide resin. By adding the epoxy resin to the polyamideimide resin as the layer improve agent, not only adherence of the polyamideimide resin to the aluminum surface increases on account of good sympathy, but the abrasion resistance increases on account of reaction (condensation reaction of the polyamideimide resin itself) between the epoxy resin and the polyamideimide resin.

The epoxysilane can increase disperse property of the solid lubricant and the hard particles relative to the polyamideimide resin. The epoxysilane which is liquid and has non-organic structure, has sympathy with the non-organic solid such as alumina, and has organic-base. Epoxysilane used as the layer improve agent can increase the disperse property between the polyamideimide resin and the non-organic solid. The epoxysilane having the epoxy-base can contribute increase of adherence.

Preferable added amount of the epoxysilane is 0.5 to 5 volume part, relative to 100 volume part of the polyamideimide resin. Adding amount of the epoxysilane less than 0.5 volume part, rendering no effect, is not preferable. Adding amount of epoxysilane more than 5 volume part, decreasing abrasion resistance and adherence, is not preferable.

1 to 12 volume part of polyester-denatured-silicon is preferably added to 100 volume part of polyamideimide resin. Using the polyester-denatured-silicon resin as the layer improve agent together with the polyamideimide resin can make the surface roughness of the coat layer small, and can form the coat layer of low friction coefficient.

Polyester-denatured-silicon resin is the adding agent which can finish the coat layer surface to realize the low friction coefficient especially in the spary coat goods. Due to small sympathy with the polyamideimide resin, polyester-denatured-silicon resin does not react with the poliamideimide resin. However, silicon film can be formed on a surface of the polyamideimide resin upon spray film forming. It has nature to reduce an interfacial tension force, so that the spray film is improved leveling property thereof to be flat.

The phenol resin and melamine resin, not rendering effect brought by the polyether-denatured-silicon resin are not preferable. It is assumed they have bad sympathy with the polyamideimide resin and do not react therewith, existing in the resin binder as the foreign matter.

As the hard particles, the alumina ($Al_2O_3$) and silicon nitride ($Si_3N_4$) of Mohs hardness 9 can be preferably used, in view of balance abrasion resistance of the slide member, and abrasion of the mate member. If hardness of the hard particle is larger than this value, abraded amount of the mate member becomes larger. If it is lower than this value, abrasion resistance of the slide member becomes insufficient. The silicon nitride or alumina can be used alone, or both of them can be put together.

Preferable average particle diameter of the hard particle is 0.1 to 5 μm, and the more preferable average particle diameter is less than 2 μm. The average particle diameter less than 0.1 μm, decreasing the abrasion the resistance and adherence, is not preferable. The particle diameter more than 5 μm, having larger mate attack property to abrade the mate member, is not preferable. In addition to small average particle diameter, uniform distribution of the particle size is required, to maintain the abrasion resistance and to restrict abrasion of the mate member. The ununiform distribution, causing variation of property, is not preferable.

Preferable adding amount of the hard particles is 1 to 15 volume part, relative to 100 volume part of the poliamide-imide resin. 5 to 10 volume part is more preferable. For making the friction coefficient of the coat layer smaller, 2 volume part is preferable, and for making the abrasion resistance of the coat layer large, 6 to 9 volume part is preferable.

As regard shape of the hard particles, a spherical shape produced by the combustion method and has small mate attack property is most preferable. Lump shape produced by gas phase crystal growth method is more preferable, and crush powder produced by crush method is preferable.

The dry coat lubricant is preferably added the solid lubricant thereto. As the solid lubricant, polytetrafluoroethylene (PTFE), molybdenum disulfide ($MOS_2$), and graphite can be used. Especially, polytetrafluoroethylene produced by emulsion polymerization, suspension polymerization or crush method can be used.

Preferable adding amount of the solid lubricant is 1 to 12 volume part relative to 100 volume part of the polyamide-imide resin, and 1 to 6 volume part is more preferable.

When the slide member is used under lubricated condition, smaller adding amount of the solid lubricant is preferable, to decrease the abrasion resistance and to increase the friction coefficient. Upper limit of 12 volume preferable. On the other hand, when the slide member is used under non-lubricated condition, larger adding amount of the solid lubricant is preferable, to increase the abrasion resistance and to decrease the friction coefficient. Lower limit of 1 volume part is preferable. Oil cavities resulted from the streak is not formed in the non-lubricate condition. However, the friction coefficient decrease effect on account of formation of the cover film, and seizing preventing effect on account of contact of the resin surface can be rendered.

The solid lubricant needs to have small size and to show effect by small amount, and the average particle diameter less than or equal to 5 μm is preferable. The slide member is typically used as the piston and the streak and the coat layer are formed on the part portion thereof. In addition, the slide member of the present invention can be adapted to members of various usages such as a piston ring, shim and clutch, regardless of lubricated condition. Likewise, there is no restriction for kind of the base member of the slide member, and various kinds of the base members can be used.

The slide member of the present invention is provided with streak on at least a part of the slide surface thereof. The streak is formed so that the ten-point height of roughness profile is 8 to 18 μmRz. Also, the slide member is provided with the coat layer (cover film) on at least a part of the slide surface, by spraying the dry coat lubricant thereon. When the slide surface of the mate member has surface roughness less than or equal to 3 μmRz, the slide member shows extremely smaller friction coefficient.

The base member, having the surface roughness less than or equal to 8 μmRz can be used, or the base member of which the surface roughness is finished to have surface roughness less than or equal to 3 μmRz can be used. Further, the base member of which the slide surface is finished to mirror level to have surface roughness of 0.5 to 1.5 μmRz can be used. In any cases, the slide surface of the base member is further provided with the streak thereon. The streak is formed so that the surface roughness is 8 to 18 μmRz by ten-point height of roughness profile. For formation of such streak, pitch of 200 to 300 μm and depth of 6 to 12 μm are selected.

In the slide member of the present invention, on the slide surface of the base member provided with the streak of which the surface roughness is 8 to 18 μmRz, the coat layer is further formed. Preferable surface roughness of the coat layer is 0.5 to 7 μmRz, and preferable thickness of the coat layer is 8 to 20 μm.

As mentioned above, Inventor has found out, after hard and careful study, formation of the streak on the slide surface of the base member, and formation of the coat layer on the slide surface thus formed, can reduce the friction coefficient. The slide surface has the surface roughness of 8 to 18 μm Rz, and the coat layer is made of the dry coat lubricant.

Reason the friction coefficient of the slide member decreases, is assumed as follows. Firstly, formation of the streak generates regular convexes and concaves on the slide surface. The coat layer to be formed on the slide surface has convex swells and the concave swells. In the concave surface portion of the coat layer the oil is filled to form the oil cavity. In this way, the slide member slides under lubricated condition, so that the friction coefficient of the slide member decreases.

In addition, on account of regular formation of the convexes and concaves, the oil cavities are also formed regularly. Decreasing operation of the friction coefficient on the surface where the oil cavities (streak) are formed becomes constant.

To the contrary, even when the coat layer is formed by spraying the normal dry coat lubricant on the slide surface provided with the streak, small convexes and concaves may be formed on the coat layer surface. However, making the coat layer thicker by the dry coat lubricant having the normal composition is difficult, and the coat layer surface is abraded and flattened at beginning of friction due to poor abrasion resistance of the dry coat lubricant. For this reason, the oil cavities are not formed or disappeared at initial friction, the above decreasing effect of the friction coefficient being not rendered.

Further, the convexes and concaves formed on the coat layer make area of the part of the slide surface contacting with the mate member narrow. Due to small abrasion resistance of the dry coat lubricant of normal composition, abraded amount of the contact (convex) portion of the coat layer contacting with the mate member is larger than that of the non-contact portion. Thus, the coat layer of the contact parts will abrade in rather short time. When the coat layer abraded, the base member disposed below the coat layer and having larger friction coefficient appears.

Thus, the friction coefficient of the slide surface provided with the streak is larger than that of not provided with the streak. Conventionally, it is said the friction coefficient of the slide member not provided with the streak—the surface roughness of the base member is small—has decreased friction coefficient.

The surface roughness of the slide member provided with the streak thereon is preferably 8 to 18 μmRz by the ten-point height of roughness profile. If the surface roughness is smaller or larger than range, decreasing effect of friction coefficient lowers. For further decreasing the friction coefficient, the slide surface provided with the streak is more preferably 8 to 15 μm. For further increasing the scuff resistance, the surface roughness of 11 to 18 μm is preferable.

The coat (film) thickness of the coat layer is determined, in connection with the above surface roughness of the base member, so that the coat layer has the sufficient surface roughness. Preferable film thickness is 8 to 20 μm. By selecting the film thickness in this range, the convex swells and the concave swells resulted from the streak are formed to decrease the friction coefficient.

The surface roughness of 0.5 to 7 μmRz of the coat layer contributes to further decrease of the friction coefficient. Surface roughness less than or equal to 3 μm is more preferable.

Also, in the slide member of the present invention, the streak formed on the slide surface of the base member can render, in addition to the friction coefficient decreasing effect, the same effect as the normal streak. Even after the coat layer is abraded and peeled off, the streak can prevent seizing of the slide member with the mate member.

The coat layer can be formed by the conventional method, for example disclosed in the reference document 4 (Japanese patent Laid-open No. 2002-16023). In advance, the slide member surface of the base member is finished by the normal finishing process such as polishing lathe, and is formed the streak thereon by the cutting process. Then, the oil component and dirt (stain) on the coat surface is removed, with applying the ultrasonic wave, by solvent degreasing or alkali degreasing.

The base member is pre-heated to 60 to 80° C., then the coat layer is formed by the well-known method such as the air spray or the screen-print method. After the coat layer is subjected to leveling by the pre-drying, it is baked and hardened by the well-known condition such as in 180° C. and for 90 minutes, or 200° C. for 20 minutes.

The baking condition such as the time period and the temperature can be selectively set. For example, lower bake temperature needs longer bake treatment, while higher bake temperature with shorter bake treatment.

For the slide surface provided with the streak an etching treatment, water blast treatment or shot blast treatment can be put together with the above mentioned treatment. They can generate a new surface on which fine and sharp convexes and concaves having the surface roughness of 30 μmRz are formed. The dry coat lubricant goes into between fine convexes and concaves to show the high adherence equivalent to the plating, by the anchor effect. The convexes and concaves formed on the new surface are not regular, but no regularity is needed to obtain anchor effect.

In one example of such treatment, the slide surface having the surface roughness of 8 to 15 μmRz by provision of the streak in pitch 200 to 300 μm and depth of 6 to 12 μm is formed. On this slide surface, the new surface having the surface roughness of 6 to 30 μmRz is formed by the etching.

In the slide member of the present invention, the coat layer can be formed on only the part of the base member or on the whole thereof, according to the using purpose of the slide member. Also, the coat layer can be formed on the whole slide surface, or on only the part thereof.

Coating of the coat layer on the whole slide surface can make the man-hour in the coating process smaller. The partial coating can render the following two advantages. That is, the coating of the minimum area can reduce man-hour needed for the dry coat lubricant, and small slide surface contacted with the mate member can further make the friction coefficient small. In addition, for improving the lubricant flow, the pattern print coating can be performed like stripe by thickness of 20 μm on the part of the slide member. Thus, the slide member in which the fluid friction is decreased to have small friction coefficient, and of which the cost is low can be obtained.

In the slide member of the present invention, the coat layer can be formed by coating few kinds of the dry cover lubricants having different composition within the composition range of each dry coat lubricant, in two layers or three layers. For example, after the first layer (abrasion resistance layer) containing the more hard particles at sides of the base member, the second layer (sympathy layer) containing the smaller hard particle can be formed on the upper surface of the first layer.

Also, after the first layer (adhesive layer, abrasion resistance layer) containing the more hard particles and layer improve agent is formed at sides of the base member, the second layer (sympathy layer) containing the smaller hard particle can be formed on the upper surface of the first layer. Further, after the first layer (abrasion resistance layer) containing the more hard particles is formed at sides of the base member, the second layer (for adapting non-lubrication and baking) containing the more solid lubricant and smaller hard particle can be formed on the upper surface of the first layer.

In the slide member of the present invention, the dry coat lubricant, on account of the excellent adherence thereof, can render good adherence, regardless of the base member. There is no limitation of kind of the base member, but cast iron, steel, various aluminum alloy, magnesium alloy, titan alloy etc. can be preferably selected. In some cases, for securing the abrasion resistance of the base member, the alloy including the hard crystalized matter, the aluminum alloy reinforced by the hard component (hard particles and hard fibers), and the magnesium alloy. In such cases, the partial diameter and the adding amount of the hard particle can be selected to obtain ideal adhered.

In the slide member of the present invention, the cover film can be formed by the screen printing, which is for example disclosed in the reference document 4 (Japanese Patent Laid-open No. 2002-16023).

PREFERRED EMBODIMENT

Hereinafter, the present invention will be explained with reference to the embodiment.

Embodiment 1

In the slide member of the present invention, a test piece (AC8A) made of the aluminum alloy is used as the base member. On the base member the streak of which the groove width being 200 to 300 μm pitch, and depth being 6 to 12 μm is formed by the cutting process. The ten-point height of roughness profile of the base member is 6 to 12 μmRz. Then, the base member is subjected to the alkali greasing.

The polyamideimide resin of 30 weight parts as the dry coat lubricant, the epoxysilane of 1 weight parts as the layer improve agent, and the alumina of 10 weight parts as the hard particle are used. Constructions of the dry coat lubricant etc. of the embodiment 1, the embodiment 2 to 5 and the comparative samples 1 to 5 to be explained later, are shown in the Tables 1 and 2.

lubricant of the embodiment 1 in which the solid matter is uniformly distributed in N-methyl pyrrolidone solution.

Formation of Cover Layer

On the base member thus prepared, the dry coat lubricant thus adjusted is coated to form the cover layer. The coating is performed by the screen printing so that the film thickness is 13 μm. The screen printing conditions are as follows. Squeeze is urethan property, hardness is 80, shape is sword shape; screen mesh is #80; contact angle between squeeze and screen is 90 degree; and work feeding speed is 15 rpm. After the coating, the coat layer is pre-dried in 60° C., for 10

TABLE 1

| | | emb. 1 | emb. 2 | emb. 3 | emb. 4 | emb. 5 |
|---|---|---|---|---|---|---|
| main agent | polyamideimide resin | 30.2% | (— | (— | (— | (— |
| layer improve agent | epoxy resin (epicoat828) | 0.2% | (— | (— | (— | (— |
| | epoxysilane | 0.9% | (— | (— | (— | (— |
| hard particle | alumina particle | 10.8% | (— | (— | (— | (— |
| dry cover film. lub. | $MoS_2$ | — | — | — | — | — |
| | solid lubricant graphite | — | — | — | — | — |
| | PTFE | — | — | — | — | — |
| | xylene | 0% | (— | (— | (— | (— |
| | N-methyl-2pyrrolidone | 30.8% | (— | (— | (— | (— |
| solvent | diacetone alcohl | 4.3% | (— | (— | (— | (— |
| surface roughness | base member slide surface | 11 μmRz | 8 μmRz | 13 μmRz | 15 μmRz | 18 μmRz |
| | coat layer surface | 4 μmRz | 2 μmRz | 7 μmRz | 9 μmRz | 12 μmRz |
| coat layer thickness | | 12 μm | 13 μm | 11 μm | 11 μm | 11 μm |
| composition similarity of dry coat lub. to present invention | | ○ | ○ | ○ | ○ | ○ |
| is streak roughness of slide surface 8 to 18 μmRz | | ○ | ○ | ○ | ○ | ○ |

TABLE 2

| | | comp. 1 | comp. 2 | comp. 3 | comp. 4 | comp. 5 |
|---|---|---|---|---|---|---|
| main agent | polyamideimide resin | 30% | 30.2% | (— | (— | (— |
| layer improve agent | epoxy resin (epicoat828) | — | 0.2% | (— | (— | (— |
| | epoxysilane | — | 0.9% | (— | (— | (— |
| hard particle | alumina particle | — | 10.8% | (— | (— | (— |
| dry cover film. lub. | $MoS_2$ | 10% | — | — | — | — |
| | solid lubricant graphite | 2% | — | — | — | — |
| | PTFE | 3% | — | — | — | — |
| | xylene | 10% | 0% | (— | (— | (— |
| | N-methyl-2pyrrolidone | 40% | 30.8% | (— | (— | (— |
| solvent | diacetone alcohl | 5% | 4.3% | (— | (— | (— |
| surface roughness | base member slide surface | 11 μmRz | 3 μmRz | 6 μmRz | 21 μmRz | 30 μmRz |
| | coat layer surface | 7 μmRz | 1 μmRz | 1 μmRz | 15 μmRz | 24 μmRz |
| coat layer thickness | | 8 μm | 15 μm | 11 μm | 10 μm | 10 μm |
| composition similarity of dry coat lub. to present invention | | x | ○ | ○ | ○ | ○ |
| is streak roughness of slide surface 8 to 18 μmRz | | ○ | x | x | x | x |

Forming method of the coat layer of the slide member of the embodiment 1 will be explained.

Adjustment of Dry Coat Lubricant

Into N-methyl-pyrrolidone solution in which the polyamideimide resin of 15 weight % is dissolved, the layer improve agent and the hard particles are added by the weight % shown in the tables 1 and 2, relative to the poliamideimide resin of 100 weight %, and is agitated. Then, the solution is mixed by the ball mill or three rollers, to obtain the dry coat min., it is baked and hardened in 180° C., for 90 min. Thus, the slide member of the embodiment 1 is obtained.

Embodiment 2

The slide member of the embodiment 2 is same as that of the embodiment 1, except that the surface roughness of the slide surface provided with the streak (streak roughness) by the ten-point height of roughness profile is 8 μmRz.

Embodiment 3

The slide member of the embodiment 3 is same as that of the embodiment 1, except that the surface roughness of the slide surface provided with the streak roughness by the ten-point height of roughness profile is 13 μmRz.

Embodiment 4

The slide member of the embodiment 4 is same as that of the embodiment 1, except that the surface roughness of the slide surface provided with the streak roughness by the ten-point height of roughness profile is 15 μmRz.

Embodiment 5

The slide member of the embodiment 5 is same as that of the embodiment 1, except that the surface roughness of the slide surface provided with the streak roughness by the ten-point height of roughness profile is 18 μmRz.

<Comparative Sample 1>

The slide member of the comparative sample 1 is same as that of the embodiment 1, except for composition of the dry coat lubricant. That is, on the slide surface of the base member same as that of the embodiment 1, the streak is provided so that the streak roughness by the ten-point height of roughness profile is 11 μmRz. On the slide surface the dry coat lubricant having coordination shown in the Tables 1 and 2 is coated by the same manner as that of the embodiment 1.

<Comparative Sample 2>

The slide member of the comparative sample 2 is same as that of the embodiment 1, except that the streak roughness by the 10-point height of roughness profile is 3 μmRz. On the slide member of the comparative sample 2, the dry coat lubricant of the same composition as that of the embodiment 1 is coated by the same manner as that of the embodiment 1, to thereby form the cover layer.

<Comparative Sample 3>

The slide member of the comparative sample 3 is same as that of the embodiment 1, except that the streak roughness by the 10-point height of roughness profile is 6 μmRz.

<Comparative Sample 4>

The slide member of the comparative sample 3 is same as that of the embodiment 1, except that the streak roughness by the 10-point height of roughness profile is 21 μmRz.

<Comparative Sample 5>

The slide member of the comparative sample 5 is same as that of the embodiment 1, except that the streak roughness by the 10-point height of roughness profile is 30 μmRz.

<Evaluate Method of Each Property>

(1-1) Abrade Test (i)

For the abrade test, LFW test machine is used. As shown in FIG. 1, the slide member (test piece) of the embodiment 1 and the comparative sample 1 are used at side of test block. The bore member FC 250 is used as the mate member (test ring).

Figure 2:
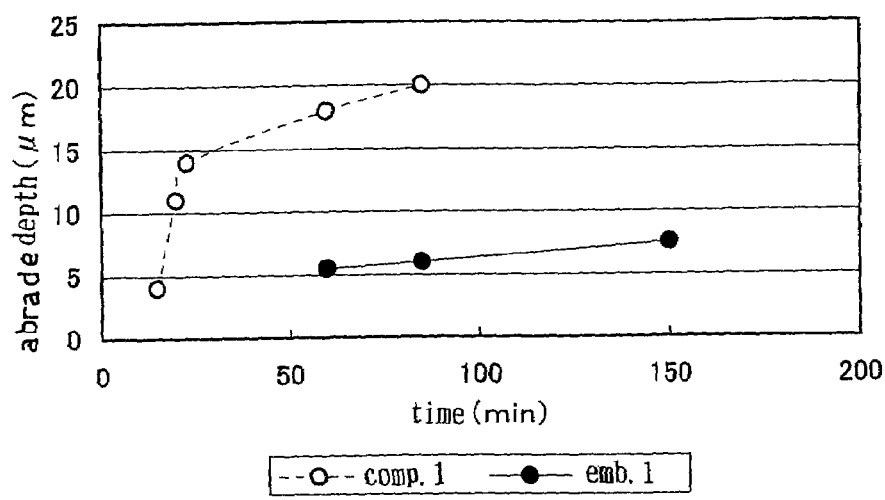
FIG. 2 is a graph representing test result of the abrade test (i)

As shown in FIG. 2, abraded depth of the coat layer of each slide member when 30 min., 90 min. and 150 min. lapsed after start of the test is measured and compared. The test conditions are as follows. Load is 45N, speed is 1.8 m/s, lubricant is KWS7330 (5W-20), and temperature is set at room temperature and is not controlled thereafter.

(1-2) Abrade Test (ii)

Figure 3:
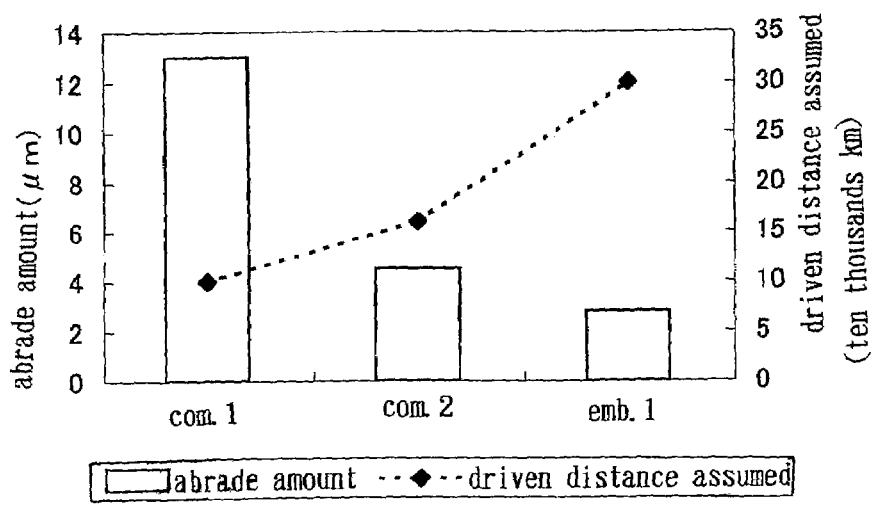
FIG. 3 is a graph representing test result of the abrade test (ii)

By using the test machine and the mate member same as that of the abrade test (i), for the slide member embodiment 1, comparative samples 1 and 2, abraded depth at 5 min. lapse after test start is measure. The test condition, except for the test time period, is same as that of the abrade test (i). Tested result is shown in FIG. 3.

(2-1) Friction Test (i)

Figure 4:
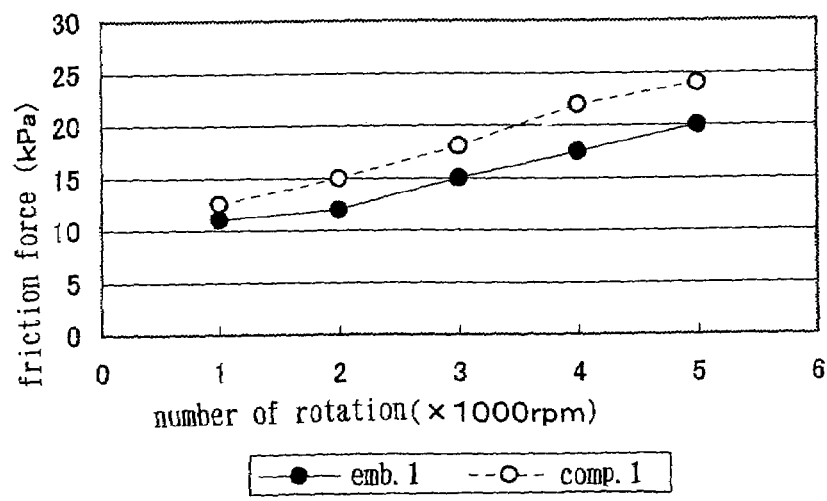
FIG. 4 is graph representing test result of the friction test (i)

The test machine LEW and the mate member same as that of the abrade test is used, and the test pieces same as the embodiment 1 and the comparative sample 1 are used. As the test condition, load of 45N, lubricant of KWS 7330 (5W-20), test time period of 90 min. and temperature of 80° C. are selected. Friction force (KPa) is measured for the each number of rotation of 1000 rpm, 2000 rpm, 3000 rpm, 4000 rpm and 5000 rpm. Tested result is shown in FIG. 4.

(2-2) Friction Test (ii)

Figure 5:
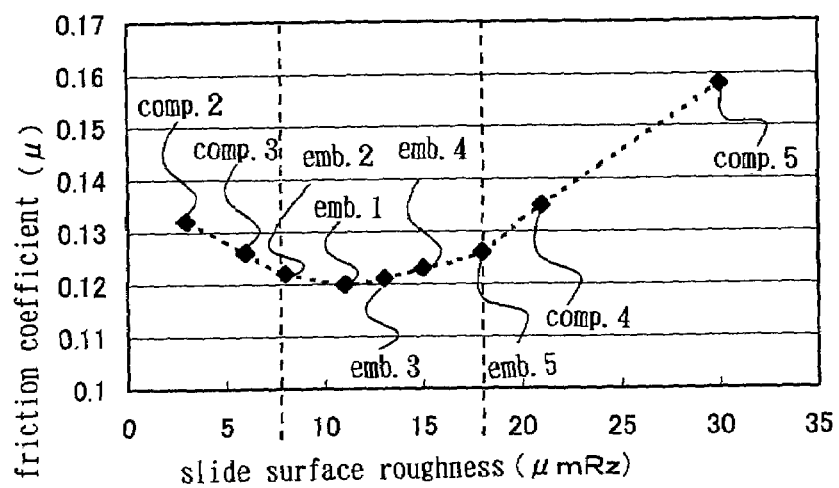
FIG. 5 is a graph representing test result of the friction test (ii)

LEW test machine and the mate member same as that of the friction test (i) are used, and the test piece same as the embodiments 1 to 4 and comparative samples 1 to 5 are used. Test condition is same as that of the friction test (i). For calculating the friction coefficient (μ), average value of the friction coefficient of each number of rotation at 30 min. lapse after start of test is calculated, then the average value of the whole number of rotation are calculated. Tested result is shown in FIG. 5.

(2-3) Friction Test (iii)

Figure 6:
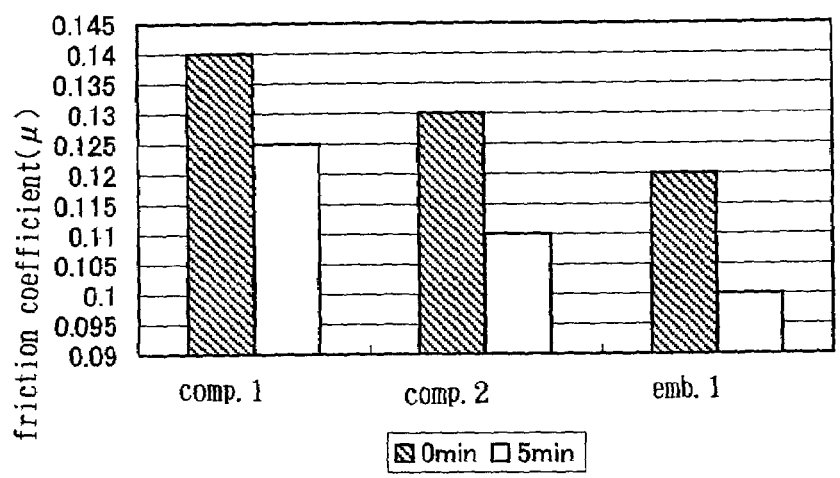
FIG. 6 is a graph representing test result of the friction test (iii)

LEW test machine and the mate member same as that of the friction test (i) are used, and the test piece same as the embodiments 1 and comparative samples 1 and 2 are used. Test condition is same as that of the friction test (i). For calculating the friction coeffcient (μ), average value of the friction coefficient of each number of rotation at 0 and 5 min. lapse after start of test is calculated, then the average value of the whole number of rotation at 0 and 5 min. lapse are calculated. Tested Result is Shown in FIG. 6.

(3) Adherence Test

Figure 7:
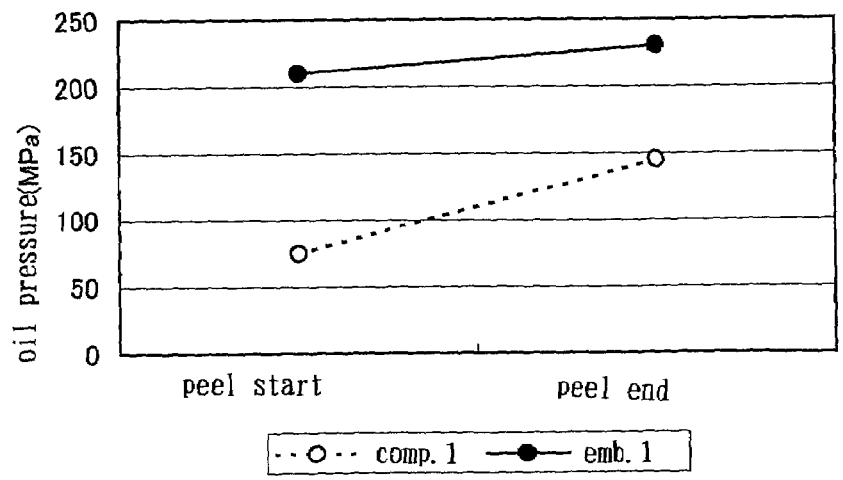
FIG. 7 is a graph representing result of the adherence test.

The slide members of the embodiments and the comparative samples are boiled for 60 min. in advance. Then, with rotating the slide member by the hydraulic adherence test machine, the oil jet is orthogonally stricken against the slide member, with increasing the oil pressure gradually. The oil jet is moved to be stricken against the whole coating surface. After the test, presence/absence of peel-off of the coat layer of each slide member is observed visually, to compared and evaluate the oil pressure at start and end of the peel-off. As the test condition, the oil pressure of 0 to 200 Mpa and room temperature are selected. The tested result is shown in FIG. 7.

(4) Scuff Evaluate Test

Figure 8:
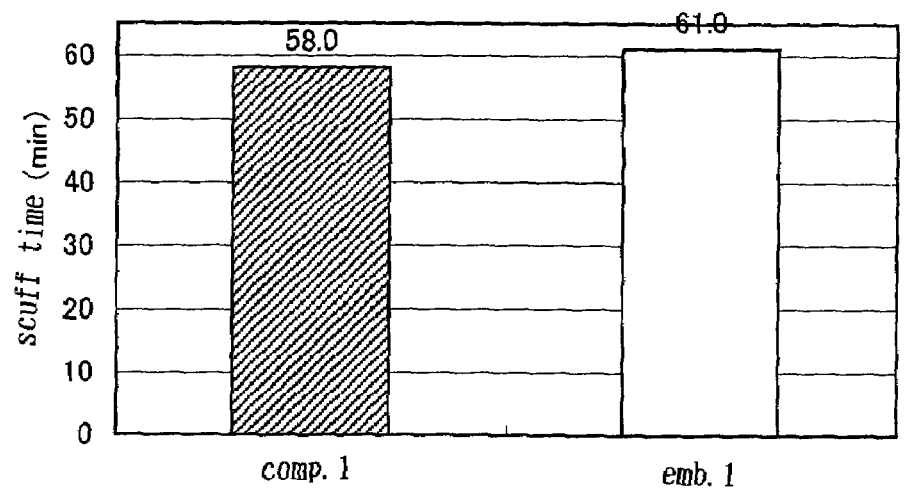
FIG. 8 is a graph representing result of the scuff evaluate test.
Figure 9:
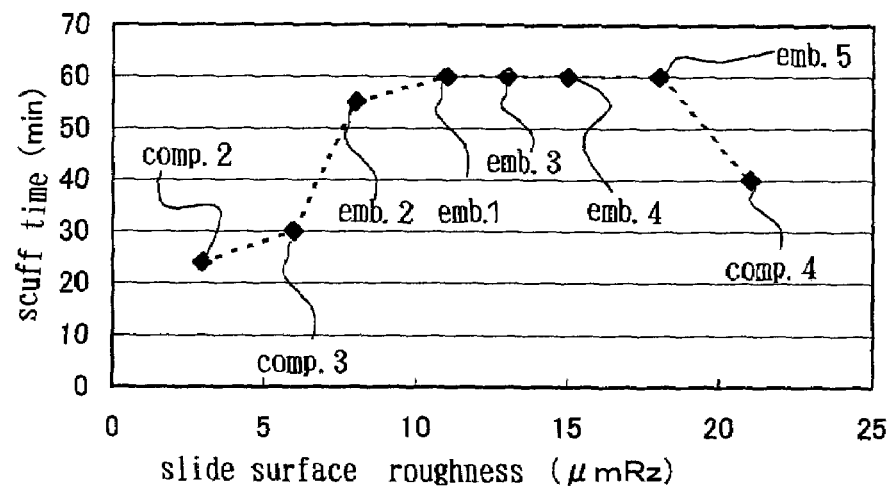
FIG. 9 is a graph representing result of the scuff evaluate test.

The scuff evaluate test is performed by the same manipulation as that of the abrade test. The slide members of the embodiments 1 to 5 and the comparative samples 1 to 4 in which the coat layer is peeled off by the above abrade test are used. Time period from the test start to scuff occurrence is confirmed for scuff measurement. Tested result is shown in FIGS. 8 and 9.

(5-1) Friction Evaluate Test by Actual Machine (i)

The slide members of the embodiment 1 and comparative sample 1 are mounted onto 1 GY single piston engine to measure friction for each operating step of the engine. The test conditions are as follows. The engine discharge amount is 500 cm³, the number of rotation of engine is 2000 rpm, pressure in the cylinder is 900 KPa. The sensor is attached to the cylinder into which the slide member (piston) is disposed for measurement of friction. The friction force (N) is calculated based on output value of the sensor (float liner system).

Figure 10:
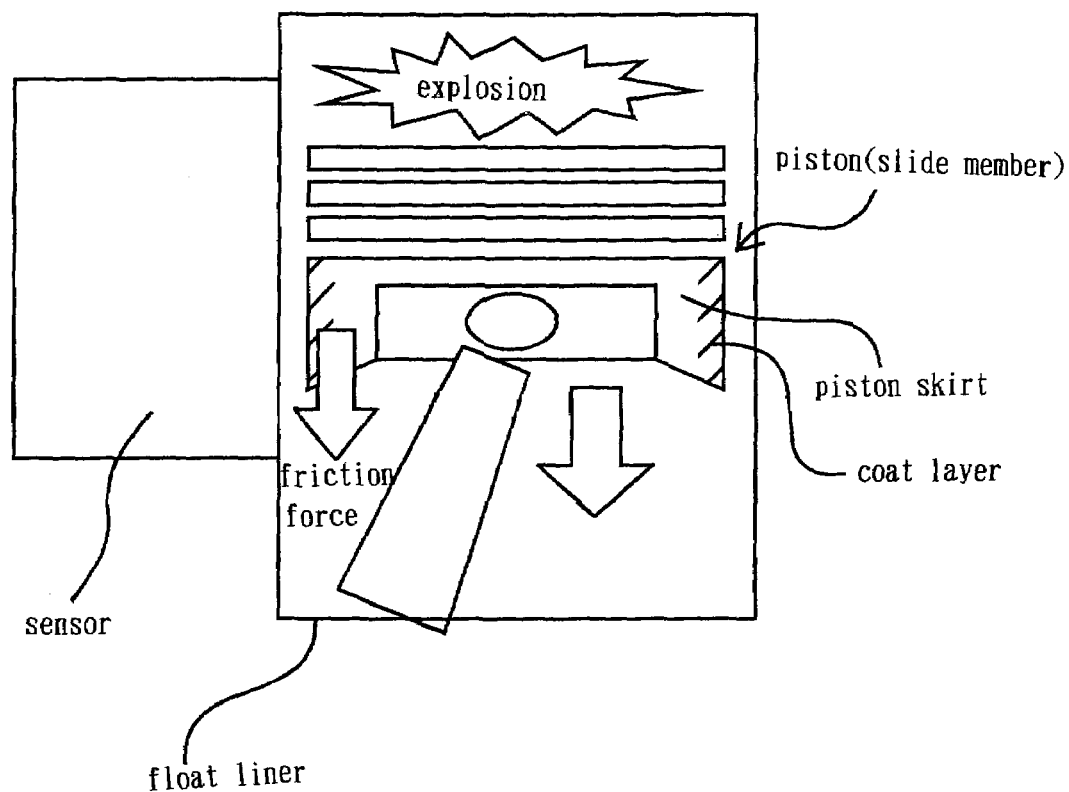
FIG. 10 is a schematic view representing test method of the machine friction evaluate test (i)
Figure 11:
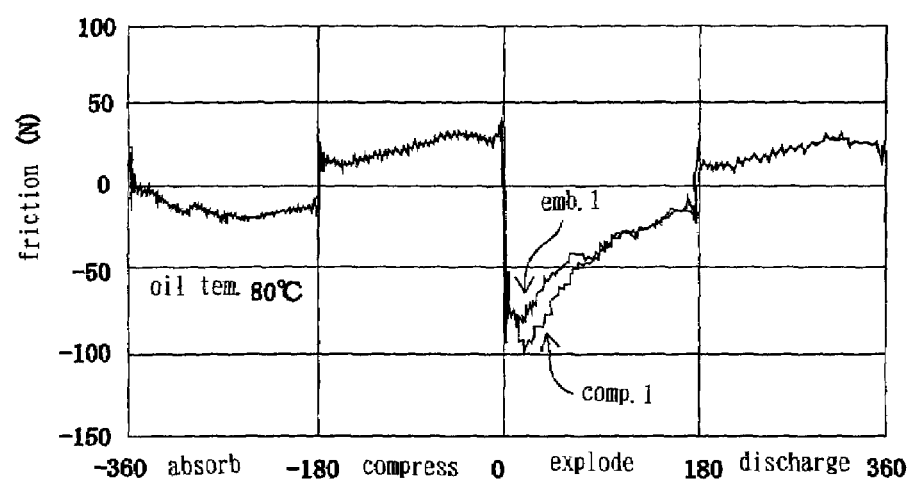
FIG. 11 is a graph representing test result of the friction evaluate test (i)

The schematic view of the test manner by the actual machine is shown in FIG. 10, and the tested result is shown in FIG. 11. On ordinates of FIG. 11, the point where upward force applied to the piston is changed to the downward force is shown by 0 (zero). Force upper than this point is shown by positive value and force lower than this point is shown by negative value. That is, absolute value of the friction force (N) shown in FIG. 11 corresponds to the actual friction force. This means as the friction force shown in FIG. 11 approaches to zero, the actual friction force decreases.

(5-2) Friction Evaluate Test by Actual Machine (ii)

Figure 12:
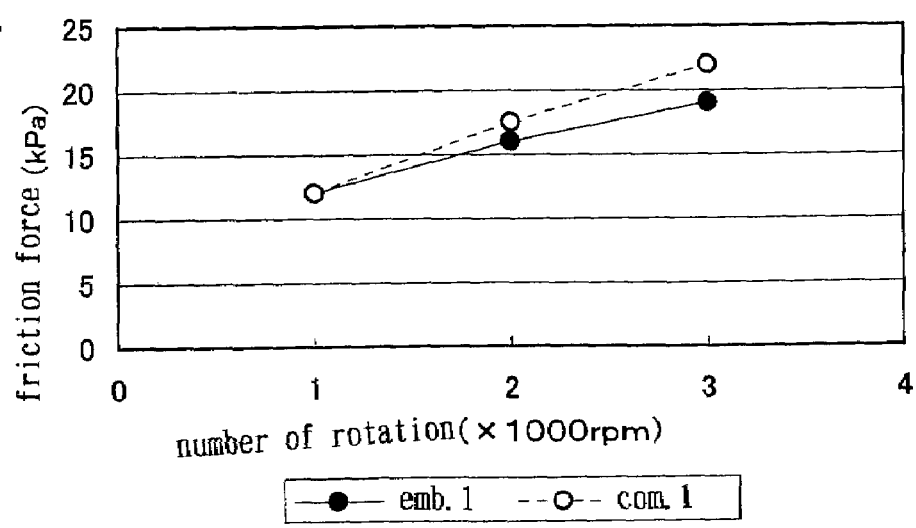
FIG. 12 is a graph representing test result of the friction test.

By using the same test machine same as that of friction test (i), with changing the number of rotations of the engine within 1000 rpm, 2000 rpm and 3000 rpm, the friction force (KPa) of each number of rotation is calculated. The tested result is shown in FIG. 12.

(Friction Test (i) (ii))

As shown in FIG. 2, in the slide member of the embodiment 1, the abrasion resistance has remarkably increased compared with the slide member of the comparative sample 1. This results from different composition of the dry coat lubricant between the embodiment 1 and the comparative sample 1. The cover layer containing the dry coat lubricant having composition of the embodiment 1 has the larger abrasion resistance, compared with the cover layer containing the dry coat lubricant having the normal composition.

As shown in FIG. 3, the abraded amount of the slide member of the comparative sample 2 is smaller than that of the comparative sample 1, and the abraded amount of the embodiment 1 is further smaller than that of the comparative sample 2.

In the slide member of the comparative sample 1, the streak is formed so that the surface roughness of the slide surface within 8 to 18 μmRz by the ten-point height of roughness profile, but the cover layer is formed by the dry coat lubricant of normal composition. To the contrary, in the slide member of the comparative sample 2, the streak is formed so that the surface roughness is beyond 8 to 18 μmRz by the ten-point height of roughness profile, but the cover layer is made of the dry coat lubricant of the embodiment 1. The decreased abraded amount of the slide member of the comparative sample 2 compared with that of the slide member of the embodiment 1, is assumed to be resulted from this composition difference of the dry coat lubricant.

The abrade amount of the slide member of the embodiment 1 further decreased compared with the slide member of the comparative sample 2. In the embodiment 1, the cover layer contains dry coat lubricant same as that of the comparative sample 2, and the streak is formed so that the ten-point height of roughness profile of the slide surface is 8 to 18 μmRz. This decreased amount is assumed to be resulted from the low friction property of the cover layer itself brought by the dry coat lubricant. Due to identity of the dry coat lubricant between the embodiment 1 and the comparative sample 2, decreasing effect of the friction coefficient by the cover layer is not clear. However, it is assumed the higher part of the coat layer formed at the convex part in the streak firstly abraded to reduce the abrade amount.

In summary, according to the slide member of the present invention, on account of the reduced abrade amount, the life time is extended.

(Friction Test (i) (ii) (iii))

As shown in FIG. 4, the friction force in the slide member of the embodiment 1 is reduced, compared with that of the comparative sample 1. This tendency is prominent in region of the number of rotation being large where the large load is applied the piston skirt. This is assumed to be resulted from composition difference of the dry coat lubricant forming the cover layer.

As shown in FIG. 5, the friction coefficient of the slide member of the embodiments 1 to 5 is decreased, compared with that of the comparative samples 2 to 4. In the former, the streak is formed on the slide member so that the ten-point height of roughness profile within 8 to 18 μmRz, while in the latter, the streak is formed so that the ten-point height of roughness profile is beyond 8 to 18 μmRz. Taking the cover layers containing the dry coat lubricant of the same composition into consideration, the streak formed to have roughness of 8 to 18 μmRz by the ten-point height of roughness profile can contribute to further decrease of the friction coefficient.

As shown in FIG. 6, the slide member of the comparative sample 2 has more excellent decrease effect of the friction efficient, compared with that of the comparative sample 1. In the comparative sample 2, the streak is formed in the same range of the present invention, and the cover layer is made of the dry coat lubricant of the same composition as the present invention. In the comparative sample 1, the streak is formed in the same range of the present invention, but the cover layer is made of the dry coat lubricant of the normal composition.

The slide member of the present invention has more excellent decrease effect of the friction coefficient than that of the comparative sample 1. In view of this, peculiar combination of the surface roughness of the slide member and the composition of the dry coat lubricant, exhibits the prominent decrease effect of the friction coefficient.

Making the surface roughness of the cover layer 0.5 to 7 μmRz by the ten-point height of roughness profile can further decrease the friction coefficient is confirmed, although detail is not shown here.

(Adherence Test)

As shown in FIG. 7, the slide member of the embodiment 1 is excellent in the adherence, compared with the slide member of the comparative sample 1. This shows the dry coat lubricant having the composition of the present invention has higher adherence than that of dry coat lubricant of the normal composition.

(Scuff Evaluate Test)

As shown in FIG. 8, although the streak is formed on both of the slide surfaces of the embodiment 1 and the comparative sample 1, the scuff resistance of the embodiment 1 is equivalent to or more excellent than the comparative sample 1. This is assumed, on account of the higher abrasion resistance of the slide surface of the embodiment 1 than that of the comparative sample 1, the time period until the base member of the embodiment 1 contacts with the mate member due to abrasion of the coat layer becomes longer.

As shown in FIG. 9, the scuff resistance, i.e. bake preventing property, of the slide members of the embodiments 1 to 5 more is excellent than that of the comparative samples 2 to 4. In the former, streak is formed so that the surface roughness of the slide surface is within 8 to 18 μmRz by ten-point height of roughness profile, while in the latter, it is formed so that the surface roughness is beyond this range. It is assumed forming the streak formed in this range by the ten-point height of roughness profile can function the oil cavities most preferably.

(Friction Evaluate Test by Actual Machine)

As shown in FIG. 11, the slide member of the embodiment 1 exhibits the remarkable decrease effect of the friction force when the large load is applied in the explode step. As shown in FIG. 12, the decrease effect of the friction becomes prominent in the region where the number of rotation of the engine is high. As apparent, the slide member of the present invention can exhibit prominent decrease effect of the friction force under the large number of rotation and large load. In view of decrease effect of the friction, the slide member is preferably used for the piston of the vehicle engine, and can exhibit improved the fuel consumption rate (mileage).

Having now fully described the present invention, it will be apparent to one of ordinary skill in the art that many changes and modifications can be made thereto without departing from the spirit or scope of the present invention as set forth herein including the appended claims.

What is claimed is:

1. A slide member comprised of a base member, and a coat layer made of a dry coat lubricant and formed on at least a part of a surface of the base member to be formed into a slide surface; characterized by that:

the part of the base member surface is provided with a streak so that a surface roughness thereof by a ten-point height of roughness profile is 8 to 18 μmRz;

the dry coat lubricant has a polyamideimide resin, at least one kind of layer improve agent selected from an epoxysilane and an epoxy resin, and at least one kind of hard particles selected from a silicon nitride and an alumina.

2. A slide member according to claim 1, wherein the layer improve agent is an epoxysilane.

3. A slide member according to claim 1, wherein the dry coat lubricant further includes one kind of solid lubricant selected from polytetrafluoroethylene, a molybdenum disulfide and a graphite.

4. A slide member according to claim 1, wherein the surface roughness of the coat layer is 0.5 to 7 μmRz by a ten-point height of roughness profile.

5. A slide member according to claim 1, wherein film thickness of the coat layer is 8 to 20 μm.

6. A slide member according to claim 1, wherein the slide member is a piston, and the streak and the coat layer is formed on a piston skirt portion of the piston.

* * * * *